3,305,321
RECOVERY AND SEPARATION OF CESIUM AND RUBIDIUM FLUORIDES USING ALCOHOLS
Fred N. Teumac, Lake Jackson, Tex., assignor to The Dow Chemical Company, Midland, Mich., a corporation of Delaware
No Drawing. Filed Jan. 6, 1964, Ser. No. 336,071
9 Claims. (Cl. 23—312)

This invention relates to a method for recovering alkali metal fluorides and, more particularly, is concerned with a novel method for separating and recovering cesium and rubidium fluorides from mixtures with other alkali metal halides.

Cesium and rubidium fluorides are generally found in admixture with other alkali metal halides. The separation of cesium and rubidium fluorides from these halides and, more particularly, the separation of cesium fluoride from rubidium fluoride heretofore has been extremely difficult and costly mainly due to the complexity of processing and high cost of separation and recovery of these materials from the source materials. An economical and simple method for facilitating these separations is thus an existing need.

It is an object of the instant invention to provide a method for separating cesium and rubidium fluoride from mixtures of other alkali metal halides which is more expedient and more economical than methods prior hereto.

A further object is to provide a new and novel method for separating cesium fluoride from rubidium fluoride.

Other objects and advantages will become more apparent after reading the detailed description disclosed hereinafter.

In general, the method of this invention comprises adding an alcohol which ionizes to give carbonium ions to an alkali metal halide source material containing cesium fluoride and/or rubidium fluoride, dissolving the cesium fluoride and/or rubidium fluoride in the alcohol, separating any undissolved alkali metal halides from the solution and recovering the cesium and/or rubidium fluoride from the alcohol fluoride solution. The cesium and rubidium fluoride-containing product solution may be concentrated, e.g., evaporated or flash distilled to effect recovery of the cesium fluoride and/or rubidium fluoride in solid form therefrom.

In carrying out the instant method, the alcohol or the mixture of said alcohol and said halide is maintained at a temperature so as to be within the liquid range of said alcohol. For optimum recoveries, elevated temperatures, i.e., above room temperature but below the boiling point of the extractant, are used.

The amount of alcohol to be employed in the process is not critical. However, maximum separation and recovery of the desired rubidium and/or cesium fluoride products as solids is obtained by using an amount of solvent such that an extract is produced which is saturated with the desired fluoride or even which provides for a small residual amount of the rubidium and/or cesium fluoride in the source mixture.

If an excess of solvent is employed, detrimental quantities of other halides present in the source material may be coextracted from the mixture.

The present process is ordinarily employed in the recovery of rubidium and cesium fluorides from other alkali metal halides. However, another advantage of the invention is that with this process, effective separation of the ordinarily difficultly separable cesium and rubidium fluorides, one from the other, readily can be realized. For this particular separation, ordinarily either t-butyl alcohol or benzyl alcohol, and preferably benzyl alcohol, is employed as the extraction medium.

The following serves to further illustrate the present invention. Cesium fluoride has a markedly higher solubility in benzyl alcohol (229 grams per liter) than does rubidium fluoride (23 grams per liter). Therefore, if the source material contained fluorides of both cesium and rubidium, as additions of benzyl alcohol, up to the saturation limit of cesium fluoride, are made to said mixture, the cesium fluoride is first separated from the mixture.

Following the separation of the alcoholic extract of cesium fluoride from the reaction mixture, the rubidium fluoride subsequently can be recovered by similar benzyl alcohol extraction and recovered from the halide mixture.

For example, by adding about one liter of benzyl alcohol to a mixture containing slightly more than about 229 grams of cesium fluoride and about 23 grams rubidium fluoride, the resulting alcoholic extract solution obtained contains substantially all of the cesium fluoride but only about 3.4 grams of rubidium fluoride. Similarly, by the addition of one liter of benzyl alcohol to a mixture of about 23 grams rubidium fluoride and quantities of potassium fluoride, the solution obtained contains substantially all of the rubidium fluoride and extremely small amounts (0.04 gram) of potassium fluoride.

Alcohols suitable for use in the method of the instant invention include:

(a) monohydroxy alcohols corresponding to the empirical formula, R—OH, wherein R is a cyclic alkyl group having from 5 to 7 carbon atoms or R is an alkenyl chain having from 3 to 7 carbon atoms, (b) aromatic carbinols corresponding to the empirical formula,

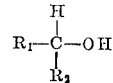

wherein $R_1$ represents a phenyl, tolyl or xylyl group and $R_2$ represents hydrogen, methyl or ethyl, (c) monohydric tertiary alcohols corresponding to the empirical formula,

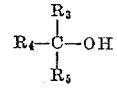

wherein $R_3$, $R_4$ and $R_5$ represent methyl, ethyl, propyl, butyl, isopropyl or isobutyl groups and further characterized in that there is a total of not more than 7 carbon atoms in the molecule, (d) secondary monohydroxy alcohols having the empirical formula,

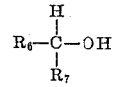

wherein $R_6$ is an alkyl group of from 1 to 3 carbon atoms and $R_7$ is an isoalkyl group of from 3 to 5 carbon atoms and further characterized in that the molecule has a total of not more than 7 carbon atoms, and (e) secondary monohydroxy alcohols having the empirical formula,

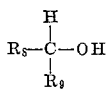

wherein $R_8$ is an alkenyl group of from 3 to 5 carbon atoms and $R_9$ is a methyl or ethyl group and further characterized in that the molecule has a total of not more than 7 carbon atoms.

Benzyl alcohol and t-butyl alcohol are preferred solvents. Examples of other specific alcohols that can be used include, but are not limited to, cyclohexanol, cyclopentanol, cycloheptanol, allyl alcohol, 4-penten-1-ol, 1-penten-3-ol, 2-buten-1-ol, 2-hepten-4-ol, hexenols, pentenols, heptenols, o-methylphenylcarbinol, o-ethylphenylcarbinol, p-methylphenylcarbinol, p-ethylphenylcarbinol, xylylcarbinol, phenylmethylcarbinol, phenylethylcarbinol, tolylmethylcarbinol, tolylethylcarbinol, methylethylisopropylcarbinol, triethylcarbinol, ethylisopropylcarbinol, 3-methyl-2-pentanol, 3-ethyl-2-pentanol, 2-ethyl-3-pentanol, methylethenecarbinol, methylpropenecarbinol, ethylethenecarbinol and ethylpropenecarbinol.

Cesium fluoride and rubidium fluoride find utility as fluorinating agents and isomerization catalysts.

The following examples are illustrative of the process of this invention.

*Example I*

About 5 grams of cesium fluoride plus about 5 grams of rubidium fluoride were mixed with about 22 cc. of benzyl alcohol for one hour at 25° C. in a glass flask equipped with a magnetic stirrer and then filtered. The filtrate was analyzed and found to contain about 4.84 grams cesium fluoride, i.e., about 96.7 percent by weight of cesium fluoride in the original dry mixture, and about 0.18 gram rubidium fluoride, i.e., about only 3.6 percent by weight of rubidium fluoride in the original dry mixture. The cesium fluoride was then recovered from the benzyl alcohol portion by evaporating off said alcohol portion.

*Example II*

About 5 grams of cesium chloride and about 5 grams of cesium fluoride were mixed with about 22 cc. of benzyl alcohol using the procedure described in Example I. The benzyl alcohol portion was analyzed and found to contain about 4.89 grams cesium fluoride, i.e., about 97.5 percent by weight of the cesium fluoride in the original mixture, and about 0.11 gram cesium chloride, i.e., about 2.2 percent by weight of the cesium chloride in the original mixture.

*Example III*

About 5 grams of rubidium fluoride and about 5 grams of rubidium chloride were admixed with about 218 cc. of benzyl alcohol using the procedure described in Example I. The benzyl alcohol portion was analyzed and found to contain about 4.99 grams rubidium fluoride, i.e., over 99.5 percent by weight of the rubidium fluoride present in the original mixture, and about 0.03 gram rubidium chloride, i.e., about 0.6 percent by weight of the rubidium chloride in the original mixture.

*Example IV*

About 5 grams of rubidium fluoride and about 5 grams of potassium fluoride were mixed with about 218 cc. of benzyl alcohol using the procedure described in Example I. The benzyl alcohol portion was analyzed and found to contain about 4.97 grams rubidium fluoride, i.e., about 99.4 percent by weight of the rubidium fluoride present in the original mixture, and about 0.035 gram potassium fluoride, i.e., about 0.70 percent by weight of the potassium fluoride present in the original mixture.

*Example V*

About 5 grams of sodium fluoride and about 5 grams of rubidium fluoride were admixed with about 218 cc. of benzyl alcohol using the procedure described in Example I. The benzyl alcohol portion was analyzed and found to contain about 4.99 grams rubidium fluoride (over 99.5 percent by weight of the rubidium fluoride in the original mixture) and about 0.03 gram sodium fluoride (about 0.6 percent by weight of the sodium fluoride in the original mixture).

In order to show the effect of increased temperature on the operation of the present process, Example VI was carried out.

*Example VI*

About 5 grams of cesium fluoride and about 5 grams of hydrated potassium fluoride were admixed with about 15 cc. of benzyl alcohol at 50° C. for one hour using the procedure described in Example I. Subsequent analysis of the solid precipitate indicated that it contained about 0.006 gram cesium fluoride. Thus, about 4.994 grams of cesium fluoride were recovered in the filtrate.

The foregoing examples illustrate the effectiveness of this invention as a method of separating certain alkali metal fluorides from mixtures of alkali metal halides.

In a manner similar to that described for the preceding examples, rubidium fluoride can be separated from sodium chloride by admixing said halides with t-butyl alcohol; cesium fluoride can be separated from potassium chloride by admixing said halides with cyclopentanol; rubidium fluoride can be separated from sodium iodide by admixing said halides with allyl alcohol; rubidium fluoride can be separated from cesium chloride by admixing said halides with 2-hepten-4-ol; cesium fluoride can be separated from sodium iodide by admixing said halides with 1-penten-3-ol; rubidium fluoride can be separated from rubidium bromide by admixing said halides with o-ethylphenylcarbinol; cesium fluoride can be separated from cesium bromide by admixing said halides with xylylcarbinol; rubidium fluoride can be separated from cesium bromide by admixing said halides with tolylmethylcarbinol; cesium fluoride can be separated from rubidium bromide by admixing said halides with triethyl carbinol; cesium fluoride can be separated from rubidium iodide by admixing said halides with ethylisopropylcarbinol; cesium fluoride can be separated from lithium chloride by admixing said halides with 3-ethyl-2-pentanol; and rubidium fluoride can be separated from lithium fluoride by admixing said halides with methylpropenecarbinol.

In all of these latter embodiments, the rubidium fluoride or cesium fluoride is extracted into the organic extractant. The resulting solution readily can be separated from the residual solid halide component and the rubidium and cesium fluoride readily recovered from the extract.

The hereinbefore-described separations and the purity of the product recovered can be increased even further by repeating the process by treating the product with an additional quantity of alcohol solvent according to the instant invention until a predetermined purity level is obtained.

Various modifications can be made in the method of the present invention without departing from the spirit or scope thereof, for it is understood that I limit myself only as defined in the appended claims.

What is claimed is:

1. A method for recovering cesium fluoride and rubidium fluoride from a mixture of alkali metal halides containing cesium fluoride and rubidium fluoride which comprises:

(a) admixing a mixture of alkali metal halides containing cesium and rubidium fluoride with a liquid alcohol which ionizes to give carbonium ions, said alcohol being a member selected from the group consisting of:

(1) monohydroxy alcohols corresponding to the empirical formula, R—OH, wherein R is a member selected from the group consisting of a cyclic alkyl group having from 5 to 7 carbon atoms and an alkenyl chain having from 3 to 7 carbon atoms;

(2) aromatic carbinols corresponding to the empirical formula,

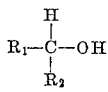

wherein $R_1$ is an aryl group selected from the class consisting of the phenyl, tolyl and xylyl groups and $R_2$ is a member selected from the group consisting of hydrogen and the methyl and ethyl groups;

(3) monohydric tertiary alcohols corresponding to the empirical formula,

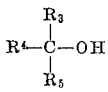

wherein $R_3$, $R_4$ and $R_5$ are members selected from the group consisting of the methyl, ethyl, propyl, butyl, isopropyl and isobutyl groups and having a total of not more than 7 carbon atoms in the molecule;

(4) secondary monohydroxy alcohols corresponding to the empirical formula,

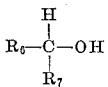

wherein $R_6$ is an alkyl group of from 1 to 3 carbon atoms and $R_7$ is an isoalkyl group of from 3 to 5 carbon atoms, and the molecule having a total of not more than 7 carbon atoms;

(5) secondary monohydroxy alcohols corresponding to the empirical formula,

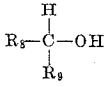

wherein $R_8$ is an alkenyl group of from 3 to 5 carbon atoms and $R_9$ is a member selected from the group consisting of the methyl and ethyl groups, the molecule having a total of not more than 7 carbon atoms;

(b) preferentially dissolving said rubidium and cesium fluoride in said alcohol;

(c) separating the alcoholic extract of said rubidium and cesium fluoride from the reaction mixture; and (d) recovering the cesium fluoride and rubidium fluoride from said extract.

2. A method of recovering cesium fluoride and rubidium fluoride from a mixture of alkali metal halides containing cesium fluoride and rubidium fluoride which comprises:

(a) admixing a mixture of alkali metal halides containing cesium and rubidium fluorides with liquid benzyl alcohol, the amount of benzyl alcohol being such to provide a saturated solution of cesium fluoride and rubidium fluoride;

(b) preferentially dissolving said cesium and rubidium fluorides in said alcohol;

(c) separating the alcoholic extract of said cesium and rubidium fluorides from the reaction mixture; and (d) recovering the cesium fluoride and rubidium fluoride from said extract.

3. A method of recovering cesium fluoride from a mixture of alkali metal halides containing cesium fluoride which comprises:

(a) admixing a mixture of alkali metal halides with liquid benzyl alcohol, said mixture containing sufficient quantities of cesium fluoride to saturate the benzyl alcohol with cesium fluoride;

(b) preferentially dissolving said cesium fluoride in said alcohol;

(c) separating the alcoholic extract of said cesium fluoride from the reaction mixture; and (d) recovering the cesium fluoride from said extract.

4. A method of separating rubidium fluoride from a mixture of alkali metal halides containing rubidium fluoride which comprises:

(a) admixing a mixture of alkali metal halides with liquid benzyl alcohol, said mixture containing sufficient quantities of rubidium fluoride to saturate the benzyl alcohol with rubidium fluoride;

(b) preferentially dissolving said rubidium fluoride in said alcohol;

(c) separating the alcoholic extract of said rubidium fluoride from the reaction mixture; and (d) recovering the rubidium fluoride from said extract.

5. A method of recovering cesium fluoride from a mixture of cesium fluoride and rubidium fluoride which comprises:

(a) admixing a mixture of cesium fluoride and rubidium fluoride with liquid benzyl alcohol, the amount of benzyl alcohol being such to provide a saturated solution of cesium fluoride;

(b) preferentially dissolving said cesium fluoride in said alcohol;

(c) separating the alcohol extract of said cesium fluoride; and (d) recovering the cesium fluoride from said extract.

6. A method of recovering cesium fluoride and rubidium fluoride from a mixture of alkali metal halides containing cesium fluoride and rubidium fluoride which comprises:

(a) admixing a mixture of alkali metal halides containing cesium and rubidium fluorides with liquid t-butyl alcohol, the amount of t-butyl alcohol being such as to provide a saturated solution of cesium fluoride and rubidium fluoride;

(b) preferentially dissolving said cesium and rubidium fluorides in said alcohol;

(c) separating the alcohol extract of said cesium and rubidium fluorides from the reaction mixture; and (d) recovering the cesium fluoride and rubidium fluoride from said extract.

7. A method of recovering cesium fluoride from a mixture of alkali metal halides containing cesium fluoride which comprises:

(a) admixing a mixture of alkali metal halides with liquid t-butyl alcohol, said mixture containing sufficient quantities of cesium fluoride to saturate the t-butyl alcohol with cesium fluoride;

(b) preferentially dissolving said cesium fluoride in said alcohol;

(c) separating the alcoholic extract of said cesium fluoride from the reaction mixture; and (d) recovering the cesium fluoride from said extract.

8. A method of recovering rubidium fluoride from a mixture of alkali metal halides containing rubidium fluoride which comprises:

(a) admixing a mixture of alkali metal halides with liquid t-butyl alcohol, said mixture containing sufficient quantities of rubidium fluoride to saturate the t-butyl alcohol with rubidium fluoride;

(b) preferentially dissolving said rubidium fluoride in said alcohol;

(c) separating the alcoholic extract of said rubidium fluoride from the reaction mixture; and (d) recovering the rubidium fluoride from said extract.

9. A method of separating cesium fluoride from a mixture of cesium fluoride and rubidium fluoride which comprises:
   (a) admixing a mixture of cesium fluoride and rubidium fluoride with t-butyl alcohol, the amount of t-butyl alcohol being such to provide a saturated solution of cesium fluoride;
   (b) preferentially dissolving said cesium fluoride in said alcohol;
   (c) separating the alcohol extract of said cesium fluoride; and
   (d) recovering the cesium fluoride from said extract.

References Cited by the Examiner
UNITED STATES PATENTS

| | | | |
|---|---|---|---|
| 2,925,323 | 2/1960 | Rimshaw | 23—25 |
| 3,179,503 | 4/1965 | Horner | 23—312 |

NORMAN YUDKOFF, *Primary Examiner.*

S. EMERY, *Assistant Examiner.*